US006588728B2

United States Patent
Kubitschek et al.

(10) Patent No.: US 6,588,728 B2
(45) Date of Patent: Jul. 8, 2003

(54) MODIFIED ISBESTER (MI) FLOW CONTROL GATE VALVE

(75) Inventors: Joseph P. Kubitschek, Boulder, CO (US); K. Warren Frizell, Arvada, CO (US); Dane W. Cheek, Denver, CO (US)

(73) Assignee: The United States of America as represented by the Secretary of the Interior, Washington, DC (US)

( * ) Notice: Subject to any disclaimer, the term of this patent is extended or adjusted under 35 U.S.C. 154(b) by 0 days.

(21) Appl. No.: 09/801,762

(22) Filed: Mar. 9, 2001

(65) Prior Publication Data

US 2002/0125455 A1 Sep. 12, 2002

(51) Int. Cl.$^7$ ................................................. F16K 3/14
(52) U.S. Cl. ......................... 251/212; 251/326; 251/328
(58) Field of Search ................................. 251/212, 326, 251/327, 328, 329; 222/542, 559

(56) References Cited

U.S. PATENT DOCUMENTS

| | | | | |
|---|---|---|---|---|
| 3,082,700 A | * | 3/1963 | Dorey ..................... 251/326 X |
| 3,226,768 A | * | 1/1966 | Zelewsky et al. ....... 251/212 X |
| 3,916,949 A | * | 11/1975 | Armstrong ............... 251/298 X |
| 3,998,426 A | * | 12/1976 | Isbester .................... 251/212 X |
| 4,182,359 A | * | 1/1980 | Rickard ................... 251/212 X |
| 4,253,487 A | * | 3/1981 | Worley et al. ........... 251/212 X |
| 4,844,292 A | * | 7/1989 | Lonardi et al. ......... 251/212 X |
| 5,241,989 A | * | 9/1993 | Kalavitis ................. 251/212 X |
| 5,692,470 A | * | 12/1997 | Sattler et al. ........... 251/300 X |
| 6,170,521 B1 | * | 1/2001 | Rohr et al. .............. 251/212 X |
| 6,179,172 B1 | * | 1/2001 | Elder et al. ............. 251/280 X |

* cited by examiner

Primary Examiner—Henry C. Yuen
Assistant Examiner—Eric Keasel
(74) Attorney, Agent, or Firm—Ross F. Hunt, Jr.

(57) ABSTRACT

A gate valve unit is provided for controlling the flow of a fluid through a conduit. The gate valve unit includes a valve body including a conduit connector member or flange. A valve face block affixed to the valve body includes first and second backwardly sloped surfaces. A pair of movable gate leaves are disposed on the first and second surfaces of the face block and are movable away from and toward a central passage through the unit for controlling fluid flow through the unit. A face seal provides a seal between the surfaces of the face block and the gate leaves. A visor seal is attached to the valve body which is movable between an operative position in which the visor seal provides sealing between the gate leaves, and an inoperable position away from the gate leaves so as to not interfere with the operation of the gate leaves.

12 Claims, 1 Drawing Sheet

MODIFIED ISBESTER (MI) FLOW CONTROL GATE VALVE

BACKGROUND OF THE INVENTION

1. Field of the Invention

This invention relates generally to the field of valves for water systems, and more specifically, to an improved gate valve for a hydraulic system.

2. Related Art

There is much interest expressed by the hydraulics industries, hydraulic equipment industries, and other parties in improved valves for regulating flow in fluid systems. By way of example, both the U.S. Government and private industry are interested in improved valves as a control component for existing dams, future dams, outer works, siphons, or other suitable pressurized water delivery systems.

The utility of improved valves is not limited to the hydraulic industry. It may additionally have significant application potential in many other industries. These other applications include use in nozzles for hydraulic cleaning equipment, in nozzles for coating or spray applications, in gas thrusters for the aerospace industry, in water thrusters for the marine industry, in atomizers for the automotive and combustion industries, and as gas expansion valves for the HVAC for the cryogenic industries.

In one common application, heavy duty control valve apparatus are incorporated at the outlets of large hydraulic conduits, particularly in river and canal outlet works, bypass lines and energy dissipaters for either submerged or free release. The valves variably restrict water discharge through the outlets, and are preferably controllable between fully open and fully closed positions.

Three of the most common types of valve configurations for hydraulic conduits are ensign valves, hollow get-flow gate valves, and valves with clamshell gates.

Disadvantages of ensign valves include the location of these valves on an up-stream dam face. This makes the valves difficult to access for maintenance purposes. In addition, ensign valves have less flow capacity than other valve arrangements,. Finally, the use of these valves may lead to cavitation damage in a downstream conduit, i.e. damage due to low hydraulic pressure pockets, just downstream of the valve surface at the water-conduit interchange.

Hollow jet-flow got gates have disadvantages as well. For example, these gates have a lowered flow capacity compared with other valve arrangements, and have the potential to cause cavitation damage to the valve itself.

Clamshell gates currently represent the best in available technology for a number of hydraulic applications. This is particularly true of dam rehabilitation projects. However, there are difficulties with the fabrication and sealing of clamshell gates and the cost of fabrication of clamshell gates for achieving adequate seal performance is high. Further, the actuators of clamshell gates are complicated.

There is specific interest in the field with respect to improving the sealing capabilities of gated valves while enhancing the ease of construction. When the gates of a dual gate valve system are in a closed position, it is important that the seal between the gates be complete so as to prevent leakage between the gates. It is also important that leakage at the edge of the conduit be prevented. These goals can be accomplished with the use of seals. However, it is important that valves with such seals be designed so as to minimize seal wear and decrease construction costs.

Attempts have been made within the art to improve the design of fluid valves. Prior art of interest in the field of fluid valves includes U.S. Pat. No. 6,009,899 (Polutnik); U.S. Pat. No. 5,692,470 (Sattler et al.); U.S. Pat. No. 5,160,119 (Lemire et al.); U.S. Pat. No. 4,844,292 (Lonardi et al.); and U.S. Pat. No. 3,998,426 (Isbester). The Polutnik patent and the Lemire patent disclose the use of dual leaf slide gates. The Lonardi et al and Sattler et al patents disclose gates having leaves movable by at least one pivoting arm. The Lonardi patent discloses a dual leaf gate-valve assembly, wherein the leaves are moved by pivoting arms. The Sattler patent is a single leaf gate-valve assembly, wherein the leaf is moved by a pivoting arm. The Isbester patent is a dual leaf clamshell design, wherein the respective leaves are rotated into a sealing position.

SUMMARY OF THE INVENTION

In accordance with the invention, a gate valve unit is provided for controlling the flow of a fluid through a conduit The unit comprises: a valve body having an outlet end and an inlet end and including, at the inlet end thereof, a conduit connector member for connecting the valve body to a fluid conduit; a valve face block having a first end and a second end, the second end being connected to the valve body, and the first end of the face block including first and second surfaces sloped backwardly from a central transverse separating edge located therebetween, the face block further including first and second sets of gate guides, each set of gate guides being located on opposite sides of one of the surfaces; the valve body, the connector member and the face block each including a central opening therein providing a central passage for fluid flow through the unit; a first and second movable gate leaves disposed respectively on the first and second surfaces of the face block and retained thereon by the gate guides so as to be movable away from and toward the central passage to thereby open and close the central passage and to thus control fluid flow through the unit; means for controlling the movement of the first and second gate leaves so as to open and close the valve unit; at least one face seal providing a seal between the surfaces of the face block and the gate leaves; a visor seal attached to the valve body and movable between an operative position, wherein the visor seal provides sealing between the gate leaves, and an inoperable position away from the gate leaves so as to not interfere with the operation of the gate leaves; and means for controlling the movement of the visor seal.

Preferably, the valve body has a cylindrical shape, the gate leaves are of rectangular shape, and the first and second surface of the face block are shaped to support the gate leaves.

Advantageously, the means for controlling the movement of the pair of gate leaves comprises at least one linear actuator. Preferably, the at least one linear actuator comprises first and second linear actuators for controlling the first and second gate leaves, respectively. Preferably, the at least one linear actuator comprises an actuator selected from the group consisting of mechanical actuators, pneumatic actuators, and hydraulic actuators.

Advantageously, the means for controlling the movement of the visor seal comprises at least one visor seal actuator. Preferably, the visor seal actuator comprises a linear actuator.

Advantageously, the visor seal comprises a visor member pivotally connected to the valve member and a seal element disposed on an inside surface of the visor member so that, in the operative position of the visor seal, the seal element faces an area of abutment of the gate leaves in the closed location thereof.

Preferably, the valve body and the face block comprises a single integral component.

Advantageously, the at least one face seal comprises an o-ring seal.

Preferably, the first and second surfaces of the valve face block slope backwardly from the central transverse separating edge at an angle of about 60°, or slope backwardly at an angle of about 45°.

Among other advantages, the gate valve of the invention controls flow in a pressurized system, such as a pressurized pipe system, while eliminating potential cavitation damage. Further, the invention provides improved sealing performance at a reduced cost of construction.

The gate value of the invention provides high capacity flow control for outlet works, siphons, or other pressurized conduits. The gate valve can be installed at the downstream end e.g. at the downstream face of a dam, of any pressurized conduit to provide flow control over a full range of gate settings, ranging from 0–100% opened. The gate valve can also be used as an in-line flow control component. Additionally, the gate valve of the invention can be operated in a free discharge or a submerged discharge mode.

Other features and advantages of the invention will be set forth in, or will be apparent from, the detailed description of the preferred embodiments which follows.

DESCRIPTION OF THE PREFERRED EMBODIMENTS

Figure 2:
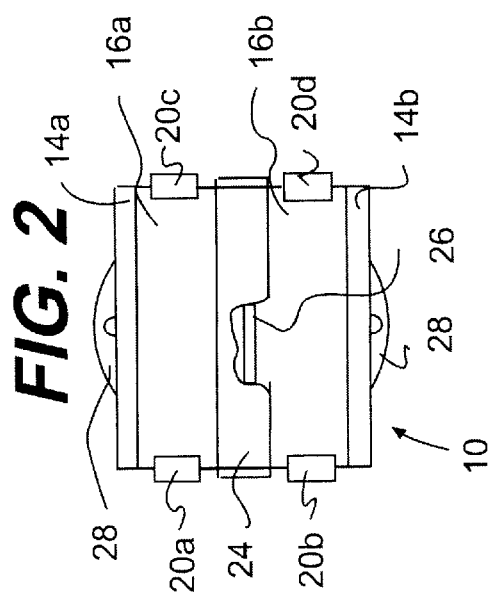
FIG. 2 is a schematic front elevational view, partially broken away, of the apparatus of FIG. 1.
Figure 1:
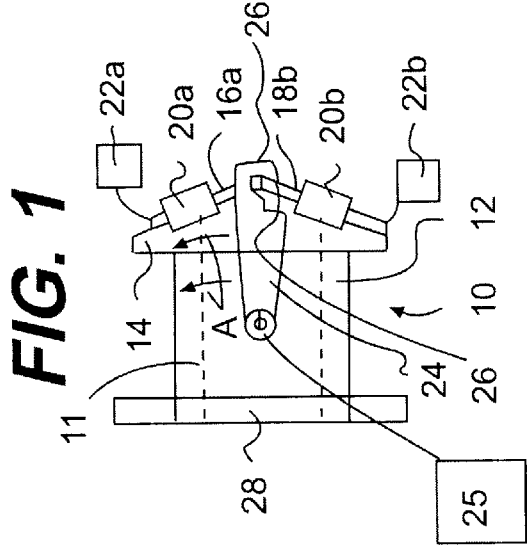
FIG. 1 is a schematic side elevational view, partially broken away, of a preferred embodiment of the gate valve apparatus of the invention.

Referring first to FIGS. 1 and 2, side elevational and front elevational views, respectively, are shown of a gate valve, generally denoted 10, constructed in accordance with a preferred embodiment of the invention. Corresponding elements have been given the same reference numbers throughout the figures. Some elements or features shown in FIG. 1 are not shown in FIG. 2, either because the given features are hidden in this view, or because the features have been omitted for purposes of clarity.

The gate valve 10 includes a valve body 12 and a valve/conduit connector which, in this embodiment, comprises a flanged connector 28. The flanged connector 28 provides a connection between the gate valve 10 and a conduit (not shown) for transferring a fluid from the conduit to the gate valve 10. The flanged connector 28, which can be formed integrally with valve body 12 or as a separate element secured to valve body 12, is circularly hollow so as to allow the fluid from the conduit to pass therethrough into the valve body 12. The fluid may be any suitable liquid or gas within the art although in the discussions below, the fluid is water.

The valve body 12 is cylindrically shaped, and is hollow so as to allow the water to flow therethrough when the gate valve 10 is open, and to hold water in place when the gate valve 10 is closed. Typically, the valve body 12 is comprised of a cylindrical spool, pipe or tubing.

Gate valve 10 also includes a valve face block 14. The valve body 12 and the face block 14 can be of an integral construction or formed in two separate components secured together, depending on the size and nature of the specific application of the gate valve 10, and associated construction requirements.

The valve face block 14 is disposed at the front of the valve body 12. The valve face block 14 provides a mechanical interface with a number of the gate elements (to be described herein) for operating the gate valve 10. The face block 14, similar to the flanged connector 28 and the valve body 12, is cylindrically hollow, so the water flows through the face block 14. As a result, a circular hollow passage 11 (see FIG. 3) extends from the rear of the flanged connection 28 to the front of the valve face block 14 and water flows through the entire gate valve apparatus 10 from the conduit to the front of the valve face block 14. The diameter of the hollow passage 11 is constant throughout the gate valve 10.

Figure 5:
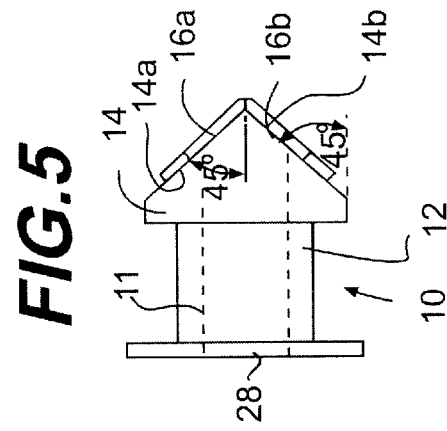
FIG. 5 is a schematic side elevational view similar to that of FIG. 4, showing part of a further embodiment of the apparatus of the invention.
Figure 4:
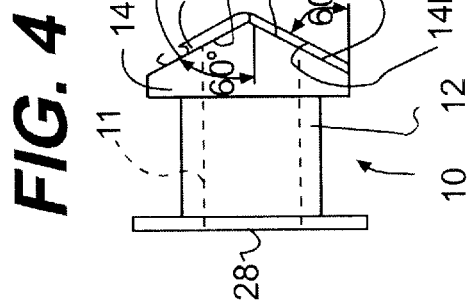
FIG. 4 is a schematic side elevational view of part of the apparatus of FIG. 1.

The flow of water is controlled by a rectangular pair of gate leaves, denoted 16a and 16b and also shown in FIGS. 4 and 5, located on the front surfaces of the face block 14. As described below, leaves 16a and 16b are movable between an opened position and a closed position. In position shown, the pair of gate leaves 16a, 16b serve in blocking the outlet of the face block 12 and are movable away from each other, so as to control the amount of flow released from the gate valve 10. The gate leaves 16a, 16b are typically constructed of a suitable metal.

Figure 3:
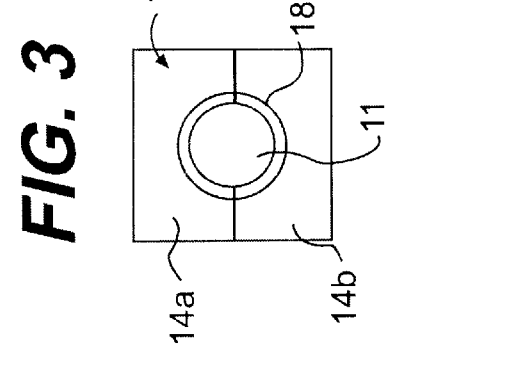
FIG. 3 is a schematic front elevational view of the valve face block of the apparatus shown in FIG. 1.

As best seen in FIGS. 3, 4 and 5, the front of the face block 14 comprises first and second surfaces 14a and 14b angled rearwardly and upwardly, and rearwardly and downwardly, respectively, from a central transverse separating edge. The rectangular gate leaves 16a, 16b are mounted on and ride on the angled surfaces 14a and 14b of the face block 14. The gate leaves 16a, 16b are each capable of independent movement in upwardly angled and downwardly angled directions, respectively, along the corresponding surfaces of the face block 14a and 14b.

As best seen in FIG. 2, the gate leaves 16a, 16b, are held in place on the respective surfaces of the face block 14 by respective sets of gate guides 20a, 20b and 20c, 20d. Thus, gate leaf 16a is retained by gate guides 20a, and 20c and gate leaf 16b is retained by gate guides 20b and 20d, respectively.

Turning to the operation of the gate leaves 16a, 166, and considering gate leaf 16a, and corresponding gate guides 20a and 20c, as representative, while the gate guides 20a, 20c retain the gate leaf 16a in place on the surface 14a of the face block 14 and prevent lateral movement thereof, the gate leaf 16a can move axially through the gate guides 20a, 20c along the surface 14a of the face block 14. The gate guides 20a, 20c preferably include strips of anti-friction material (not shown) for minimizing wear between the gate leaf 16a and the associated gate guides 20a, 20c as the gate leaf 16 moves therethrough. The anti-friction material strips are typically comprised of polytetrafluoroethylene or other suitable anti-friction material.

As will be apparent, gate leaf 16a can move in an upward direction when opening, and in a downward direction when closing the passage 11. The other gate leaf 16b moves in a downward direction when opening, and in an opposite, upward direction when closing the passage 11. In both opening and closing movements, the gate leaves 16a, 16b move simultaneously, in a balanced manner.

When the flow of water is to be stopped, the gate leaves 16a, 16b are moved into a closed position in which they cover the circular outlet of the face block 14, thereby blocking water flow from the gate valve 10. When water flow is to be allowed through the valve, the gate leaves 16a, 16b are moved along the face block surfaces 14a and 14b to an open position away from the center of the face block 14. A set of linear actuators, indicated schematically at 22a and 22b, provide control of the operation of the gate valve 10. More specifically, the gate leaf linear actuators 22a, 22b move the pair of gate leaves 16a, 16b as described hereinbefore, so as to open and close the gate valve 10. The arrangement described above results in a simplified actuator. configuration for opening and closing the gates as compared with prior art valve constructions. The linear actuators 22a, 22b can be mechanical, pneumatic or hydraulic, depending upon the individual application of the gate valve 10.

In FIGS. 1 and 2, the gate valve 10 is in the closed position. The flow rate from the gate valve 10 when opened is proportional to the amount of gate opening and the available total head. The slope of the valve face block 12 enables the gate leaves 16a, 16b to rest against the surface of the face block 12 while being capable of respective upward and downward opening and closing movements along the face block 12.

In FIGS. 4 and 5, the positions of the gate leaves 16a, 16b, when in an opened position, are shown in dashed lines. Referring particularly to FIG. 4, in this embodiment of gate valve 10 the surfaces 14a and 14b have a slope of 60°. In FIG. 5, surfaces 14a and 14b have a slope of 45° as shown. It will be appreciated that other slopes can be used.

Turning to FIGS. 3 and 4, at least one face seal 18 (not visible in FIGS. 1 and 2) is located at the surface of the face block 14 between the surfaces 14a and 14b of face block 14 and the facing surfaces of gate leaves 16a, 16b. The face seal 18 can be any suitable type of seal. These seal types include a conventional type of seal such as an o-ring, bellows or mechanical, or a special type of seal designed for a specific valve. An o-ring face type seal 18 is illustrated in the drawings. As illustrated in FIG. 3, the o-ring seal 18 surrounds the circular water passage 11 in the face block 14. The o-ring seal 18 provides a surrounding seal about the circular water passage which prevents water from escaping from the entrance and entering into the space between the face block 14 and the gate leaves 16a, 16b. The o-ring seal 18 also enables continued smooth operation. Importantly, the o-ring seal 18 provides a water seal which does not come into direct contact with the flow of water through the face block 14. This is an important feature which prevents wear on the seal.

It will be appreciated that when the gate leaves 16a, 16b are in the closed position thereof, it is important that a seal be provided to prevent leakage between the gate leaves 16a, 16b. Sealing between the gate leaves 16a, 16b is provided by a lip seal visor 24 which is shown in FIGS. 1 and 2 and is pivotally attached to the valve body 12. When the gate valve 10 is closed, the lip seal visor 24 is lowered into the position shown in FIGS. 1 and 2 in proximity to the junction at which the opposed edges of gate leaves 16a, 16b abut. The lip seal visor 24 includes a lip seal, indicated schematically at 26, that fits over the junction between the gate leaves 16a, 16b, thereby providing a seal therebetween. The lip seal 26 is located on the valve side of the lip seal visor 24, and is preferably a bellows type seal. The lip seal visor 24 is partially cut away in FIGS. 1 and 2 to show the lip seal 26. The lip seal visor 24 is rotated in and out of the sealing position thereof through the action of a lip seal actuator 25. The lip seal visor actuator 25 is typically a linear actuator, but can be another type of actuator, depending upon the application.

When the gate valve 10 is in an open position and the gate leaves 16a, 16b are moved to an open position, the seal visor 24 is raised by the lip seal visor actuator 25 to position away from the area of the gates 16a, 16b, as indicated by a pair of large arrows A above the lip seal visor 24. The lip seal visor 24 provides a secure seal when the gate valve 10 is closed without interfering with the operation of the gate leaves 16a, 16b. The lip seal 26 provides improved sealing of the gate valve 10 when the valve is fully closed. In addition, the seal provided between the gate leaves 16a, 16b is not subject to wear from the flow of water from the open gate valve 10 because the lip seal 26 is not attached to either of the gate leaves 16a, 16b and is removed from the area thereof when the gate valve 10 is open.

The combination of seals described results in improved sealing capability for the valve 10. As indicated above, the lip seal visor 24 is moved downwardly and upwardly, into and out of place adjacent to the junction of the gate leaves 16a, 16b by the lip seal actuator 25. A number of suitable actuator devices can be used for this purpose and a variety of seal types for the lip seal 26 can be used as well.

As indicated previously, because neither the face seal 18 nor the lip seal 25 is subjected to the high-velocity flow passing through the gate valve 10, the overall sealing configuration provided for the gate valve 10 results in improved performance at reduced cost.

The size of the gate valve 10 depends upon the application of the gate valve. Typically, the size of the gate valve 10 falls within the range for standard piping and tubing. However, gate valves of non-standard size can be constructed. In addition, the invention can be constructed from any suitable materials of construction within the art and, in this regard, the simplicity of the design reduces design and fabrication costs. As set forth hereinbefore, the valve may be operated in a free discharge mode, or a submerged discharge mode, and the gate valve may be used for a wide range of applications, and with a wide range of working fluids.

Although the invention has been described above in relation to preferred embodiments thereof, it will be readily understood by those skilled in the art that variations and modifications can be effected in those embodiments without departing from the scope and spirit of the invention.

What is claimed is:

1. A gate valve unit for controlling the flow of a liquid through a fluid conduit, said unit comprising:

a valve body having an outlet end and an inlet end and including, at the inlet end thereof, a conduit connector member for connecting the valve body to the conduit;

a valve face block having a first end and a second end, said second end being connected to the valve body, and the first end of the face block including first and second surfaces sloped backwardly from a central transverse separating edge located therebetween, said face block further including first and second sets of gate guides, each set being located on opposite sides of one of said surfaces;

the valve body, the connector member and the face block each including a central opening therein providing a central passage for fluid flow through the unit;

a first and second movable gate leaves disposed respectively on the first and second surfaces of the face block and retained thereon by said gate guides so as to be movable away from and toward said central passage to thereby open and close said central passage and to thus control fluid flow through the unit;

means for controlling the movement of said first and second gate leaves so as to open and close the valve unit;

at least one face seal providing a seal between the surfaces of the face block and the gate leaves;

a visor seal attached to the valve body and movable between an operative position, wherein the visor seal provides sealing between the gate leaves, and an inoperable position away from the gate leaves so as to not interfere with the operation of the gate leaves;

and means for controlling the movement of the visor seal.

2. A gate valve according to claim 1, wherein the valve body has a cylindrical shape, wherein the gate leaves are of rectangular shape, and wherein the first and second surface of the face block are shaped to support the gate leaves.

3. A gate valve according to claim 1, wherein the means for controlling the movement of the pair of gate leaves comprises at least one linear actuator.

4. A gate valve according to claim 3, wherein said at least one linear actuator comprises first and second linear actuators for controlling the first and second gate leaves, respectively.

5. A gate valve according to claim 3, wherein the at least one linear actuator comprises an actuator selected from the group consisting of mechanical actuators, pneumatic actuators, and hydraulic actuators.

6. A gate valve according to claim 1, wherein the means for controlling the movement of the visor seal comprises at least one visor seal actuator.

7. A gate valve according to claim 6, wherein said visor seal actuator comprises a linear actuator.

8. A gate valve according to claim 1, wherein the visor seal comprises a visor member pivotally connected to said valve body and a seal element disposed on an inside surface of said visor member so that, in the operative position of said visor seal, said seal element faces an area of abutment of said gate leaves in the closed location thereof.

9. A gate valve according to claim 1, wherein the valve body and the face block comprise a single integral component.

10. A gate valve according to claim 1, wherein the at least one face seal comprises an o-ring seal.

11. A gate valve according to claim 1, wherein the first and second surfaces of the valve face block slope backwardly from the central transverse separating edge at an angle of about 60°.

12. A gate valve according to claim 1, wherein the first and second surfaces of the valve face block slope backwardly from the central transverse separating edge at an angle of about 45°.

* * * * *